(12) United States Patent
Sugimura et al.

(10) Patent No.: US 11,050,224 B2
(45) Date of Patent: Jun. 29, 2021

(54) WIRE HARNESS UNIT, POWER STORAGE DEVICE UNIT, AND WIRE HARNESS

(71) Applicant: Yazaki Corporation, Tokyo (JP)

(72) Inventors: Kazuo Sugimura, Shizuoka (JP); Mitsuaki Morimoto, Shizuoka (JP); Kazuya Tsubaki, Shizuoka (JP); Eiichiro Oishi, Shizuoka (JP); Shoichi Nomura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/226,975

(22) Filed: Dec. 20, 2018

(65) Prior Publication Data
US 2019/0199075 A1    Jun. 27, 2019

(30) Foreign Application Priority Data

Dec. 25, 2017    (JP) .............................. JP2017-248334
Nov. 26, 2018    (JP) .............................. JP2018-220539

(51) Int. Cl.
*H02G 3/03*    (2006.01)
*H01B 9/00*    (2006.01)
(Continued)

(52) U.S. Cl.
CPC ................ *H02G 3/03* (2013.01); *B60L 53/14* (2019.02); *B60L 53/22* (2019.02); *H01B 9/006* (2013.01);
(Continued)

(58) Field of Classification Search
CPC .......... H02G 3/03; H02G 3/02; H02G 3/0481; H02G 3/38; B60L 53/14; B60L 53/16; B60L 58/26; B60L 53/18; B60L 53/302; B60L 55/00; B60L 53/00; B60L 2240/36; B60L 53/53; B60L 58/24;
(Continued)

(56) References Cited

U.S. PATENT DOCUMENTS 5,909,099 A * 6/1999 Watanabe ............ A61K 31/726
                                                        320/108
6,220,955 B1 * 4/2001 Posa ...................... F21V 29/56
                                                        454/184
(Continued)

FOREIGN PATENT DOCUMENTS

CN    203243026 U    10/2013
JP    07-065869 A    3/1995
(Continued)

*Primary Examiner* — Mandeep S Buttar
(74) *Attorney, Agent, or Firm* — Sughrue Mion, PLLC (57) ABSTRACT

A wire harness unit applied to a power storage device unit and a wire harness includes a routing material and a cooling unit that cools the routing material. The routing material constitutes a charging conduction path that extends between a charging inlet and a power storage device, and transmits electricity. The charging inlet is provided to a vehicle. The power storage device is provided to the vehicle and can store electric power. As a result, the wire harness unit, the power storage device unit, and the wire harness can reduce a cross-sectional area of the routing material to a relatively small area, thereby having an advantageous effect of capable of having proper mountability.

14 Claims, 6 Drawing Sheets

(51) Int. Cl.
*H01M 10/46* (2006.01)
*B60L 53/14* (2019.01)
*B60L 53/22* (2019.01)
*H01M 50/528* (2021.01)

(52) U.S. Cl.
CPC ......... *H01M 10/46* (2013.01); *H01M 50/528* (2021.01); *H01M 2220/20* (2013.01)

(58) Field of Classification Search
CPC ......... B60L 2240/445; B60L 2240/662; H01B 9/006; H01B 7/423; H01B 7/425; H01M 2/22; H01M 10/46; H01M 2220/20; H01M 10/613; H01M 10/625; H02J 50/80; H02J 5/005; H02J 2007/0096; H02J 7/045; H02J 50/00; H02J 7/0027; H02J 7/0052; H02J 7/1453; H04B 5/0037; Y02T 10/7005; Y02T 90/14; Y02T 10/7077; Y02T 10/7241; H01R 2201/26
USPC ......................................................... 361/699
See application file for complete search history.

(56) References Cited

U.S. PATENT DOCUMENTS

| | | | | |
|---|---|---|---|---|
| 7,622,897 | B2* | 11/2009 | Eberhard | B60L 58/12 320/150 |
| 2009/0002956 | A1* | 1/2009 | Suwa | H01R 9/2425 361/728 |
| 2013/0029193 | A1* | 1/2013 | Dyer | H01M 10/625 429/62 |
| 2015/0217654 | A1* | 8/2015 | Woo | B60L 53/11 320/109 |
| 2016/0221458 | A1* | 8/2016 | Lopez | H05K 7/20927 |
| 2018/0111499 | A1* | 4/2018 | Wada | H01M 50/317 |

FOREIGN PATENT DOCUMENTS

| | | |
|---|---|---|
| JP | 2011-020553 A | 2/2011 |
| JP | 2013-180728 A | 9/2013 |

* cited by examiner

FIG.9

WIRE HARNESS UNIT, POWER STORAGE DEVICE UNIT, AND WIRE HARNESS

CROSS-REFERENCE TO RELATED APPLICATION(S)

The present application claims priority to and incorporates by reference the entire contents of Japanese Patent Application No. 2017-248334 filed in Japan on Dec. 25, 2017 and Japanese Patent Application No. 2018-220539 filed in Japan on Nov. 26, 2018.

BACKGROUND OF THE INVENTION

1. Field of the Invention

The present invention relates to a wire harness unit, a power storage device unit, and a wire harness.

2. Description of the Related Art

As an example of conventional techniques relating to wire harnesses mounted on vehicles, Japanese Patent Application Laid-open No. 2013-180728 discloses an electric vehicle harness routing structure that includes a power unit, a charging port, a charging harness, a first harness clip, and a second harness clip. The charging harness is composed of a plurality of harnesses that connect the power unit elastically supported on a vehicle body and the charging port fixedly supported on the vehicle body. The first harness clip fixes a halfway portion of the multiple harnesses to the vehicle body while distances between the harnesses are kept. The second harness clip fixes a halfway portion of the harnesses between the first harness clip and the power unit to the power unit while the distances between the harnesses are kept.

In the electric vehicle harness routing structure described in Japanese Patent Application Laid-open No. 2013-180728, voltage and current of electric power flowing in the harnesses tend to relatively increase with an increase in demand for high charging electric power output by quick charging, for example. Even in such a case, it is desired for the electric vehicle harness routing structure to have proper mountability.

SUMMARY OF THE INVENTION

In view of such a circumstance, the invention is made and aims to provide a wire harness unit, a power storage device unit, and a wire harness that have proper mount ability.

In order to achieve the above mentioned object, a wire harness unit according to one aspect of the present invention includes a routing material that extends between a charging inlet provided to a vehicle and a power storage device provided to the vehicle and capable of storing electric power, and constitutes a charging conduction path transmitting electricity; and a cooling unit that cools the routing material.

According to another aspect of the present invention, in the wire harness unit, it is possible to configure that the cooling unit includes a cooling pipe at least a part of which is provided along the routing material and inside which a cooling medium is able to flow, and is capable of cooling the routing material by the cooling medium flowing inside the cooling pipe.

According to still another aspect of the present invention, in the wire harness unit, it is possible to configure that the cooling pipe constitutes a charging conduction path cooling circulation system branched from a power storage device cooling circulation system in which the cooling medium circulates and cools the power storage device by the cooling medium.

According to still another aspect of the present invention, in the wire harness unit, it is possible to configure that the cooling unit includes a flow path control valve that is capable of performing control such that the cooling medium flows to the power storage device and the cooling medium flows to the cooling pipe.

According to still another aspect of the present invention, in the wire harness unit, it is possible to configure that the routing material includes a plate-shaped conductor that has conductivity and a plate shape, and constitutes at least a part of the charging conduction path, and the cooling pipes are provided at least on both sides of the plate-shaped conductor in a thickness direction of the plate-shaped conductor as a pair sandwiching the plate-shaped conductor.

According to still another aspect of the present invention, in the wire harness unit, it is possible to configure that the routing material includes a wire-shaped conductor that is formed in a wire shape by bundling a plurality of element wires having conductivity and constitutes at least a part of the charging conduction path, and the cooling pipe is provided such that the cooling pipe covers an outside of the wire-shaped conductor.

According to still another aspect of the present invention, in the wire harness unit, it is possible to configure that the cooling medium is a liquid, and the cooling unit includes a pump that supplies the cooling medium inside the cooling pipe.

According to still another aspect of the present invention, in the wire harness unit, it is possible to configure that the cooling medium is a gas, and the cooling unit includes a fan that supplies the cooling medium inside the cooling pipe.

In order to achieve the above mentioned object, a power storage device according to still another aspect of the present invention includes a power storage device that is provided to a vehicle and capable of storing electric power; a routing material that extends between a charging inlet provided to the vehicle and the power storage device, and constitutes a charging conduction path transmitting electricity; and a cooling unit that cools the routing material.

In order to achieve the above mentioned object, a wire harness according to still another aspect of the present invention includes a routing material that extends between a charging inlet provided to a vehicle and a power storage device provided to the vehicle and capable of storing electric power, constitutes a charging conduction path transmitting electricity, and is cooled by a cooling unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment according to the invention in detail with reference to the accompanying drawings. The following embodiment does not limit the invention. The constituent elements described in the following embodiment include those easily envisaged by those skilled in the art and substantially identical ones.

Embodiment

Figure 1:
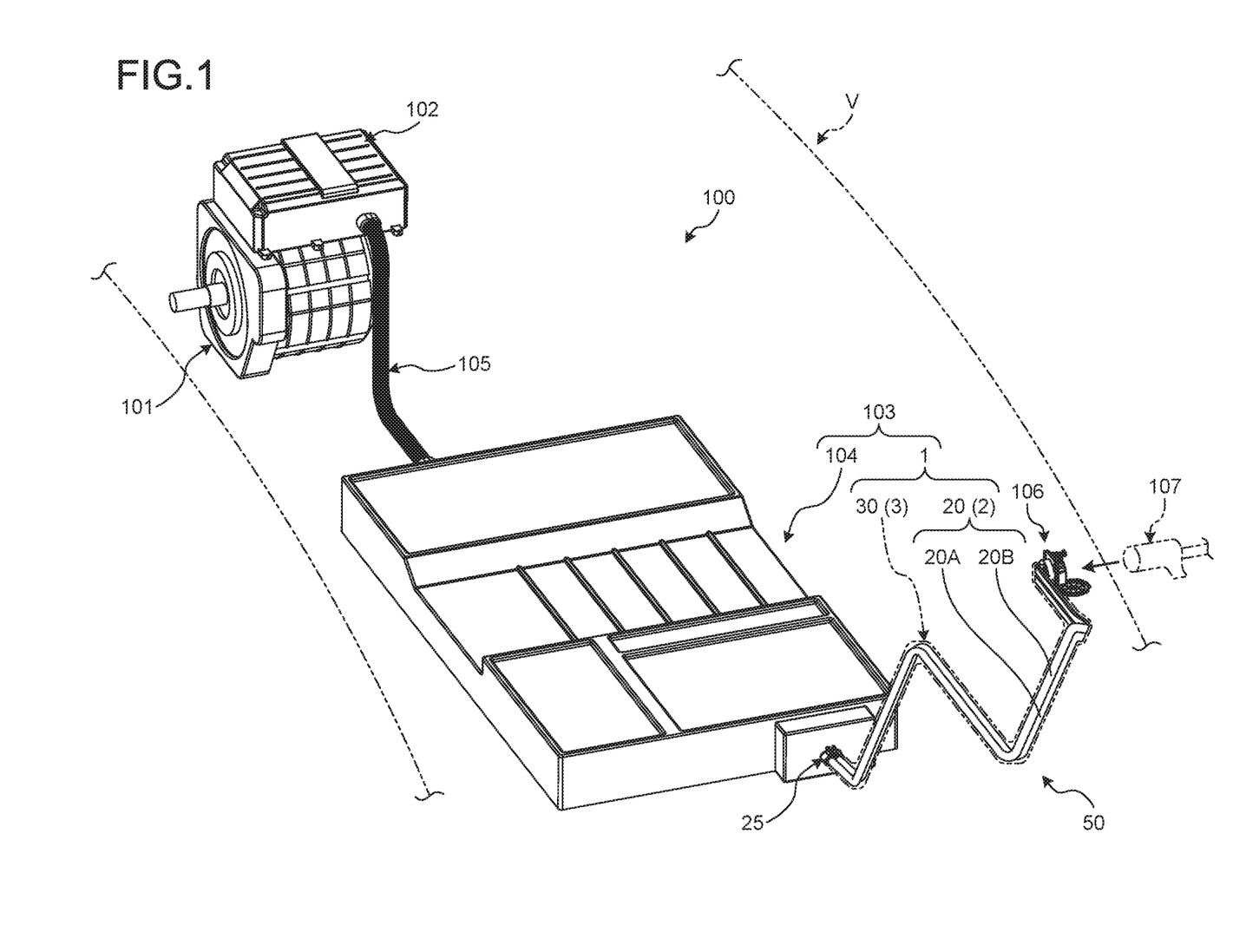
FIG. 1 is a schematic perspective view illustrating a schematic structure of an electric vehicle (EV) system to which a wire harness unit according to an embodiment is applied.

A wire harness unit 1 according to an embodiment illustrated in FIG. 1 is an electric module that is mounted on a vehicle V and connects various equipment in the vehicle V to be used for supplying electric power, for example. The vehicle V in the embodiment is typically an electric vehicle (EV) or a plug-in hybrid electric vehicle (PHEV). The wire harness unit 1 constitutes an EV system 100 in the vehicle V. The EV system 100 constitutes a power unit that generates power for running the vehicle V from electric power in the vehicle V. The EV system 100 includes a motor generator 101, an inverter 102, and a power storage device unit 103. The motor generator 101 is a power source that is provided to the vehicle V and generates power for running the vehicle V. The motor generator is what is called a rotating machine. The inverter 102 is provided to the vehicle V and can interconvert direct current power and alternating current power. The power storage device unit 103 includes a power storage device 104 that is provided to the vehicle V and can store electric power. The power storage device 104 is a chargeable and dischargeable secondary battery. The power storage device 104 includes a battery pack in which a plurality of battery cells are arranged and electrically connected to each other, for example. The motor generator 101 is electrically connected to the inverter 102. The inverter 102 is electrically connected to the power storage device 104 of the power storage device unit 103 with a cable 105 interposed therebetween. In the EV system 100 thus structured, the inverter 102 converts direct current power supplied from the power storage device 104 via the cable 105 into alternating current power, and supplies the motor generator 101 with the alternating current power. In the EV system 100, the motor generator 101 is driven by the alternating current power supplied from the inverter 102 and generates power for running the vehicle V.

Figure 2:
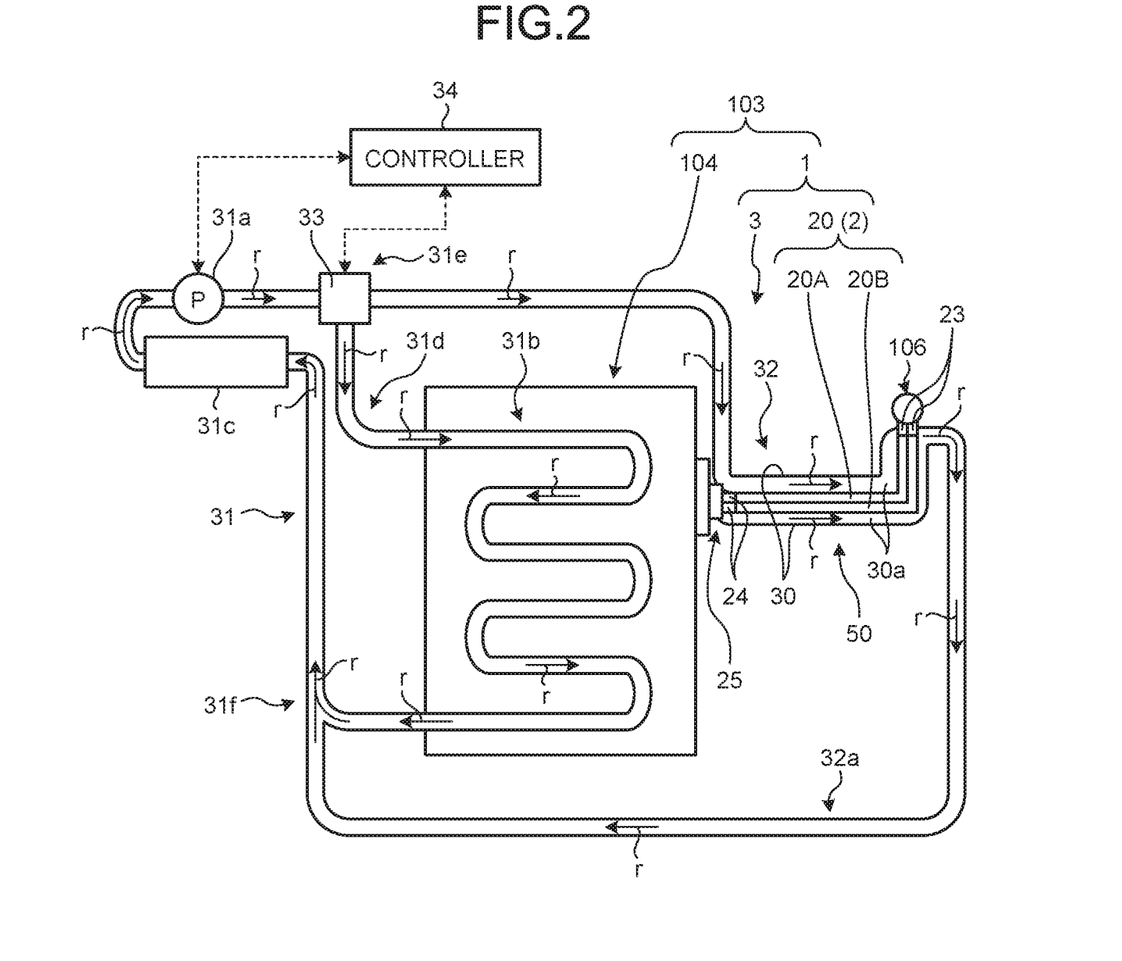
FIG. 2 is a schematic block diagram illustrating a schematic structure of a power storage device unit to which the wire harness unit according to the embodiment is applied.

The power storage device unit 103 of the EV system 100 in the embodiment further includes the wire harness unit 1 in addition to the power storage device 104 as illustrated in FIGS. 1 and 2. The wire harness unit 1 includes a wire harness 2 that is electrically connected to the power storage device 104. The wire harness 2 is routed between a charging inlet 106 provided to the vehicle V and the power storage device 104. The wire harness 2 constitutes what is called a charging wire harness. The charging inlet 106 constitutes a charging port to which a charging connector 107 can be fitted. The charging connector 107 is electrically connected to a power source and can receive electric power from the power source. The wire harness 2 electrically connects the charging connector 107 fitted to the charging inlet 106 and the power storage device 104. The wire harness 2 supplies the power storage device 104 with direct current power for charging the power storage device 104 from the charging connector 107 fitted to the charging inlet 106. The power storage device 104 is charged by the direct current power supplied from the charging connector 107 via the charging inlet 106 and the wire harness 2.

In the EV system 100 thus structured, voltage and current of direct current power flowing in the wire harnesses 2 tend to relatively increase with an increase in demand for high output of charging direct current power by quick charging, for example. In such a trend, the wire harness unit 1 in the embodiment further includes, besides the wire harness 2, a cooling unit 3 that cools the wire harness 2. This structure allows the wire harness unit 1 to prevent an increase in cross-sectional shape of a conduction portion of a charging conduction path 50 formed by the wire harness 2 even in a case where voltage and current of the direct current power flowing in the wire harness 2 increase. The following describes the structure of the wire harness unit 1 in detail with reference to the respective drawings.

The wire harness unit 1 in the embodiment includes the wire harness 2 and the cooling unit 3, as described above. The wire harness 2 in the embodiment includes a routing material 20 cooled by the cooling unit 3. In other words, the wire harness unit 1 includes the routing material 20 and the cooling unit 3. The power storage device unit 103 includes the power storage device 104, the routing material 20, and the cooling unit 3.

In the following description, the wire harness 2 in the embodiment is typically a charging wire harness for quick charging in which direct current power flows that has a relatively high output (e.g., about 150 kW) with a high voltage (e.g., about 400 to 500 V) and a high current (e.g., about 300 to 400 A). The wire harness 2 supplies the power storage device 104 with direct current power having a relatively high voltage and a high current as charging power. In the wire harness unit 1 in the embodiment, the cooling unit 3 is applied to the wire harness 2 serving as the charging wire harness for quick charging. In the EV system 100, besides the wire harness 2 serving as the charging wire harness for quick charging, a charging wire harness may be included for normal charging in which direct current power flows that has a relatively low output with a low voltage and a low current. In this case, in the EV system 100, the wire harness unit 1 is applied to the wire harness 2 serving as the charging wire harness for quick charging. The wire harness 2 may include a communication line that connects the charging inlet 106 and the power storage device 104 and transmits various electrical signals.

The wire harness 2 includes the routing material 20 that constitutes the charging conduction path 50. In the vehicle V, the charging conduction path 50 is a conduction path that extends between the charging inlet 106 and the power storage device 104 and transmits electricity. More specifically, the charging conduction path 50 is a conduction path for quick charging and supplies the power storage device 104 with direct current power having a relatively high voltage and a high current, as charging power, from the charging connector 107 fitted to the charging inlet 106. The routing material 20 is routed such that the routing material 20 extends between the charging inlet 106 and the power storage device 104, and constitutes the charging conduction path 50.

In the wire harness 2, the routing material 20, which constitutes the charging conduction path 50, is provided with a supply wire 20A for power supply and a ground wire 20B for grounding, i.e., two wires. The supply wire 20A is a routing body that is electrically connected to a positive electrode of the power storage device 104 and transmits electric power having a certain voltage and a certain current to the power storage device 104. The ground wire 20B is a routing body that is electrically connected to a negative electrode of the power storage device 104 and establishes what is called grounding. The charging conduction path 50, thus, includes two systems, one of which is the supply wire 20A serving as a conduction path for power supply and the other of which is the ground wire 20B serving as a conduction path for grounding. The supply wire 20A and the ground wire 20B are formed individually, and routed by being formed in a shape according to a routing path in the vehicle V, for example. The supply wire 20A and the ground wire 20B may extend side by side with a distance therebetween or extend in closely contact with each other without a distance therebetween. In the following description, the supply wire 20A and the ground wire 20B are simply described as the "routing material 20" when they do not need to be particularly described individually.

Figure 3:
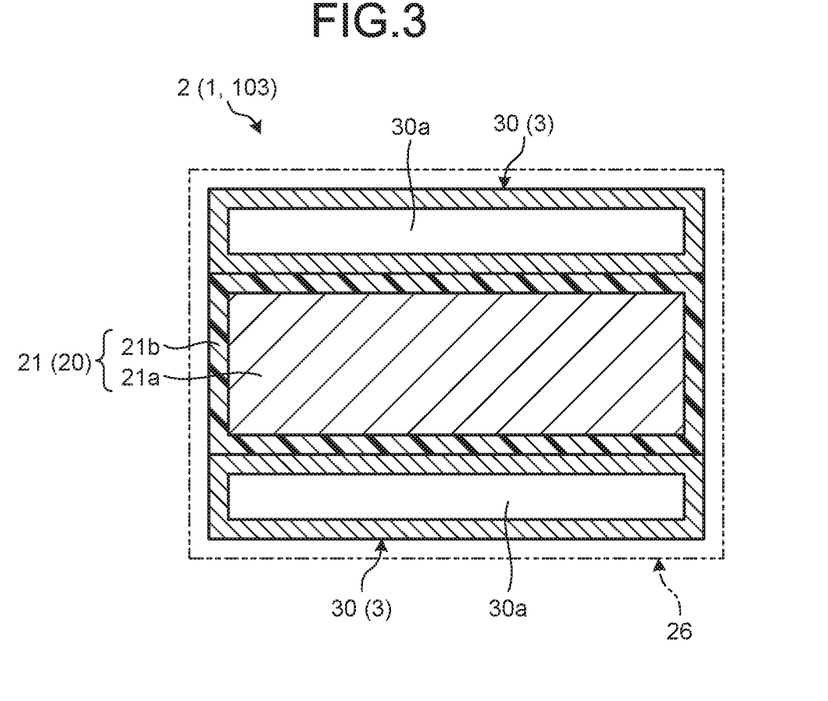
FIG. 3 is a schematic cross-sectional view illustrating a schematic structure of a covered bus bar of the wire harness unit according to the embodiment.
Figure 4:
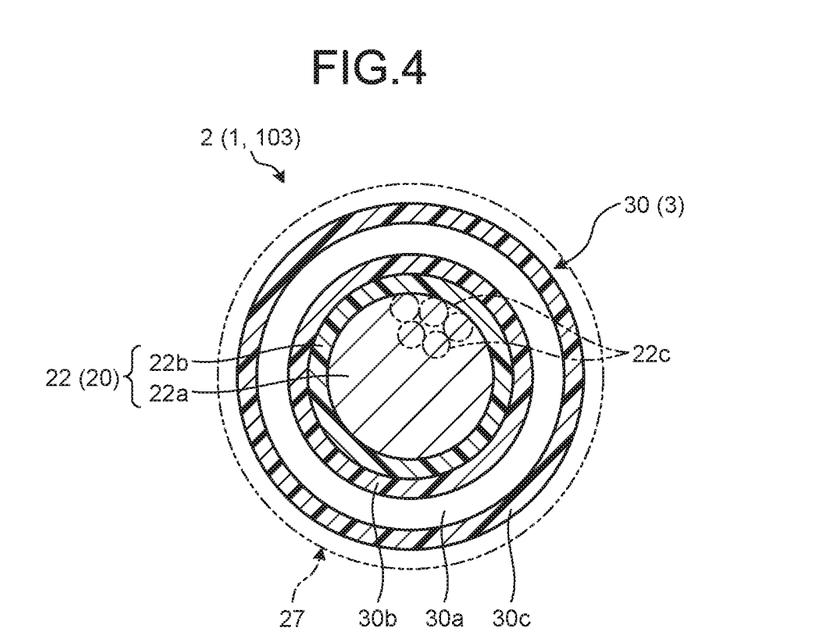
FIG. 4 is a schematic cross-sectional view illustrating a schematic structure of a covered electrical wire of the wire harness unit according to the embodiment.

The routing material 20 in the embodiment may include a covered bus bar 21 illustrated in FIG. 3 or a covered electrical wire 22 illustrated in FIG. 4.

As illustrated in FIG. 3, the covered bus bar 21 includes a plate-shaped conductor 21a having conductivity and a plate-shaped conductor insulating cover 21b having insulation property. The covered bus bar 21 is what is called an insulation bus bar in which the plate-shaped conductor insulating cover 21b covers an external surface side of the plate-shaped conductor 21a. The plate-shaped conductor 21a has conductivity and is formed in a plate shape. When the covered bus bar 21 is applied to the routing material 20, the plate-shaped conductor 21a constitutes at least a part of the charging conduction path 50. The plate-shaped conductor 21a is a plate-shaped conductor formed in a substantially rectangular shape and made of a metallic material in which electricity is transmitted. For the plate-shaped conductor 21a, a bus bar or an extruded flat routing material can be used, for example. The plate-shaped conductor 21a is made of copper, a copper alloy, aluminum, or an aluminum alloy, for example. The plate-shaped conductor 21a in the embodiment is made of aluminum or an aluminum alloy. The plate-shaped conductor 21a in the embodiment is what is called an aluminum flat bar. The plate-shaped conductor 21a is formed such that the plate-shaped conductor 21a has a cross-sectional shape substantially identical in the extending direction of the plate shape. The plate-shaped conductor 21a typically has higher stiffness than that of a wire-shaped conductor 22a, which is described later. The plate-shaped conductor insulating cover 21b is a bus bar cover (what is called a sheath) formed of a resin material having insulation property. The plate-shaped conductor insulating cover 21b is provided in contact with an external surface of the plate-shaped conductor 21a, and covers the external surface of the plate-shaped conductor 21a. The plate-shaped conductor insulating cover 21b is formed on the external surface side of the plate-shaped conductor 21a by extrusion molding of an insulating resin material such as polypropylene (PP), polyvinyl chloride (PVC), or cross-linked polyethylene (PE), which is appropriately selected taking into consideration of abrasion resistance, chemical resistance, and heat resistance, for example. The plate-shaped conductor insulating cover 21b may be formed by applying a resin material on a surface of the plate-shaped conductor 21a by dipping processing or spraying processing, for example. In the dipping processing, the plate-shaped conductor 21a is dipped into a resin material so as to be covered with the resin material. In the spraying processing, the plate-shaped conductor 21a is covered with a resin material by spraying the resin material. The plate-shaped conductor insulating cover 21b may be formed by setting a heat shrinkable tube formed of a resin material in a tube shape in such a manner that the heat shrinkable tube covers the external surface of the plate-shaped conductor 21a and heating the heat shrinkable tube to be shrunk with heat. The plate-shaped conductor insulating cover 21b is formed between one end and the other end of the plate-shaped conductor 21a in the extending direction of the plate-shaped conductor 21a. The cross-sectional shape (cross-sectional shape perpendicular to the extending direction) of the plate-shaped conductor 21a is a substantially rectangular shape. The cross-sectional shape (cross-sectional shape perpendicular to the extending direction) of the plate-shaped conductor insulating cover 21b is substantially rectangular frame shape. The covered bus bar 21, thus, has a cross-sectional shape of a substantially rectangular shape. The supply wire 20A and the ground wire 20B may use the plate-shaped conductor insulating cover 21b in common with each other. The plate-shaped conductor insulating cover 21b may cover the plate-shaped conductor 21a of the supply wire 20A and the plate-shaped conductor 21a of the ground wire 20B, respectively, and integrate the two plate-shaped conductors 21a.

As illustrated in FIG. 4, the covered electrical wire 22 includes the wire-shaped conductor 22a having conductivity and a wire-shaped conductor insulating cover 22b having insulation property. The covered electrical wire 22 is what is called an insulated wire core in which the wire-shaped conductor insulating cover 22b covers an external surface side of the wire-shaped conductor 22a. The wire-shaped conductor 22a is a core wire formed in a wire shape by bundling and twisting a plurality of element wires 22c having conductivity, and is formed of a metallic material in which electricity is transmitted. When the covered electrical wire 22 is applied to the routing material 20, the wire-shaped conductor 22a constitutes at least a part of the charging conduction path 50. The element wire 22c is made of copper, a copper alloy, aluminum, or an aluminum alloy, for example. The element wire 22c in the embodiment is made of copper or a copper alloy. The wire-shaped conductor 22a is formed such that the wire-shaped conductor 22a has a substantially identical diameter in the extending direction of the wire shape. The wire-shaped conductor 22a typically has higher flexibility than that of the plate-shaped conductor 21a. The wire-shaped conductor insulating cover 22b is an electrical wire cover (what is called a sheath) formed of a resin material having insulation property. The wire-shaped conductor insulating cover 22b is provided in contact with an external surface of the wire-shaped conductor 22a, and covers the external surface of the wire-shaped conductor 22a. The wire-shaped conductor insulating cover 22b is formed on the external surface side of the wire-shaped conductor 22a by extrusion molding of an insulating resin material such as polypropylene (PP), polyvinyl chloride (PVC), or cross-linked polyethylene (PE), which is appropriately selected taking into consideration of abrasion resistance, chemical resistance, and heat resistance, for example. The wire-shaped conductor insulating cover 22b may be formed in the same manner as the plate-shaped conductor insulating cover 21b by applying a resin material on a surface of the wire-shaped conductor 22a by dipping processing or spraying processing, for example. The wire-shaped conductor insulating cover 22b may be formed of a heat shrinkable tube made of a resin material. The wire-shaped conductor insulating cover 22b is formed between one end and the other end of the wire-shaped conductor 22a in the extending direction of the wire-shaped conductor 22a. The cross-sectional shape (cross-sectional shape perpendicular to the extending direction) of the wire-shaped conductor 22a is a substantially circular shape. The cross-sectional shape (cross-sectional shape perpendicular to the extending direction) of the wire-shaped conductor insulating cover 22b is a substantially circular ring shape. The covered electrical wire 22, thus, has a cross-sectional shape of a substantially circular shape. The supply wire 20A and the ground wire 20B may use the wire-shaped conductor insulating cover 22b in common with each other. The wire-shaped conductor insulating cover 22b may cover the wire-shaped conductor 22a of the supply wire 20A and the wire-shaped conductor 22a of the ground wire 20B, respectively, and integrate the two wire-shaped conductors 22a.

The routing material 20 in the embodiment may form the whole of the charging conduction path 50 by the covered bus bar 21. The routing material 20 in the embodiment may form the whole of the charging conduction path 50 by the covered electrical wire 22. The routing material 20 may form one portion of the charging conduction path 50 by the covered bus bar 21 and form the other portion of the charging conduction path 50 by the covered electrical wire 22. The covered bus bar 21 and the covered electrical wire 22 may be electrically connected with a joint portion interposed therebetween. In this case, the portion formed by the covered bus bar 21 typically serves as a path regulating portion in the wire harness 2. The other portion formed by the covered electrical wire 22 serves as a deformation allowable portion in the wire harness 2. The path regulating portion regulates the routing path of the charging conduction path 50 in the charging conduction path 50. The deformation allowable portion allows the deformation of the charging conduction path 50 in the charging conduction path 50. The routing material 20 includes the covered bus bar 21 serving as the path regulating portion and the covered electrical wire 22 serving as the deformation allowable portion, thereby making it possible to enhance workability of various works such as a routing work.

As illustrated in FIG. 2, the routing material 20 is provided with an inlet terminal 23 at the end on the charging inlet 106 side of the charging conduction path 50. The routing material 20 is provided with a connection terminal 24 at the end on the power storage device 104 side of the charging conduction path 50. The inlet terminal 23 is held by the charging inlet 106 while the inlet terminal 23 is electrically connected to the end on the charging inlet 106 side of the routing material 20. The inlet terminal 23 is electrically connected to the charging connector 107 fitted to the charging inlet 106 while the inlet terminal 23 is held by the charging inlet 106. This structure allows the routing material 20 to be electrically connected to the charging connector 107 fitted to the charging inlet 106 via the inlet terminal 23. The connection terminal 24 is held by a connector housing 25 while the connection terminal 24 is electrically connected to the end on the power storage device 104 side of the routing material 20. The connection terminal 24 is electrically connected to the power storage device 104 while the connection terminal 24 is held by the connector housing 25. This structure allows the routing material 20 to be electrically connected to the power storage device 104 via the connection terminal 24.

The cooling unit 3 cools the routing material 20 of the wire harness 2. As illustrated in FIGS. 1 and 2, the cooling unit 3 in the embodiment includes a cooling pipe 30. At least a part of the cooling pipe 30 is provided along the routing material 20. Inside the cooling pipe 30, a cooling medium r can flow. The cooling pipe 30 is a hollow member having a flow path 30a that is formed inside the cooling pipe 30 and in which the cooling medium r can flow. The cooling unit 3 in the embodiment thus structured makes it possible to cool the routing material 20 by the cooling medium r flowing inside the cooling pipe 30. The cooling medium r is liquid that can flow in the flow path 30a of the cooling pipe 30. The cooling medium r is any of various heat exchange media performing heat exchange at respective portions. The cooling medium r in the embodiment includes liquid, for example, water, antifreeze liquid, and the like. The cooling pipe 30 is typically provided in such a manner that the cooling pipe 30 is adjacent to and in contact with the routing material 20 along the whole length of the routing material 20 from the charging inlet 106 to the power storage device 104. This structure allows the cooling pipe 30 to cool the whole of the routing material 20 by the cooling medium r flowing in the flow path 30a. The cooling pipe 30 is preferably provided such that the cooling pipe 30 can also cool the joint portions of the inlet terminal 23 and the connection terminal 24. The joint portions tend to relatively and easily generate heat. The cooling pipe 30 may be made of a metallic material having good heat conductivity or a resin material having good flexibility, for example.

For example, when the cooling pipe 30 is applied to the covered bus bar 21 as illustrated in FIG. 3, the cooling pipe 30 is formed in a substantially rectangular tube shape. A space inside the cooling pipe 30 serves as the flow path 30a of the cooling medium r. In this case, the cooling pipes 30 are preferably provided at least both sides in the thickness direction of the plate-shaped conductor 21a of the covered bus bar 21 as a pair sandwiching the plate-shaped conductor 21a. Each cooling pipe 30 is preferably provided such that the cooling pipe 30 faces substantially the whole surface of the plate-shaped conductor 21a in the direction perpendicular to the thickness direction. In this case, the wire harness 2 may further include an exterior member 26 that forms the outermost layer and has a substantially rectangular tube shape, such as a corrugated member. The exterior member 26 may cover outsides of the covered bus bar 21 and the cooling pipes 30 to protect the covered bus bar 21 and the cooling pipes 30. In the wire harness 2, the covered bus bar 21 and the cooling pipes 30 may be bundled by a banding band or a banding tape. In the wire harness 2, a mutual positional relation between the covered bus bar 21 and the cooling pipes 30 may be fixed by a clip, for example. In the example illustrated in FIG. 3, the cooling pipes 30 are made of a metallic material.

For example, when the cooling pipe 30 is applied to the covered electrical wire 22 as illustrated in FIG. 4, the cooling pipe 30 is composed of an inner tube 30b formed in a substantially cylindrical shape and an outer tube 30c formed in such a substantially cylindrical shape that the outer tube 30c externally covers the inner tube 30b. In the cooling pipe 30, a mutual positional relation between the inner tube 30b and the outer tube 30c is fixed by a spacer, for example. An internal space having a substantially ring shape defined by the inner tube 30b and the outer tube 30c serves as the flow path 30a of the cooling medium r. In this case, the cooling pipe 30 is preferably provided such that the covered electrical wire 22 is inserted inside the inner tube 30b and the inner tube 30b externally covers the wire-shaped conductor 22a of the covered electrical wire 22. In this case, the wire harness 2 may further include an exterior member 27 that forms the outermost layer and has a substantially cylindrical shape, such as a corrugated member. The exterior member 27 may externally cover the covered electrical wire 22 and the cooling pipe 30 to protect the covered electrical wire 22 and the cooling pipe 30. In the wire harness 2, the covered electrical wire 22 and the cooling pipe 30 may be bundled by a banding band or a banding tape. In the wire harness 2, a mutual positional relation between the covered electrical wire 22 and the cooling pipe 30 may be fixed by a clip, for example. In the example illustrated in FIG. 4, the cooling pipe 30 is made of a resin material.

The cooling unit 3 in the embodiment includes a power storage device cooling circulation system 31, a charging conduction path cooling circulation system 32, a flow path control valve 33, and a controller 34. The cooling pipe 30 constitutes a part of the charging conduction path cooling circulation system 32.

The power storage device cooling circulation system 31 is a cooling system in which the cooling medium r circulates and cools the power storage device 104. The power storage device cooling circulation system 31 includes a pump 31a, a heat exchange unit 31b, a cooling device 31c, and a circulation path 31d that connects the pump 31a, the heat exchange unit 31b, and the cooling device 31c, and in which the cooling medium r circulates. The pump 31a is a pumping device that applies pressure to the cooling medium r in the circulation path 31d to deliver the cooling medium r to respective portions. The pump 31a corresponds to a pump that performs pressure feed the cooling medium r inside the cooling pipe 30. The heat exchange unit 31b is a heat exchanger that performs heat exchange between the cooling medium r circulating in the circulation path 31d and the power storage device 104 to cool the power storage device 104. The cooling device 31c cools again the cooling medium r having a temperature increased by the heat exchange at the heat exchange unit 31b, for example. For the cooling device 31c, various types of devices can be used. An example of such devices is a device that forcibly cools the cooling medium r using a cooling fan or a secondary cooling medium. In the circulation path 31d, the cooling medium r pumped by the pump 31a circulates through the heat exchange unit 31b and the cooling device 31c, and thereafter enters the pump 31a again.

In the power storage device cooling circulation system 31 thus structured, the cooling medium r pumped by the pump 31a flows in the circulation path 31d and enters the heat exchange unit 31b. The cooling medium r having entered the heat exchange unit 31b exchanges heat with the power storage device 104 in the heat exchange unit 31b to cool the power storage device 104. The cooling medium r after the heat exchange in the heat exchange unit 31b is discharged from the heat exchange unit 31b while having a higher temperature than that before the heat exchange, and flows in the circulation path 31d to enter the cooling device 31c. The cooling medium r having entered the cooling device 31c is cooled by the cooling device 31c. The cooling medium r after being cooled by the cooling device 31c is discharged from the cooling device 31c while having a temperature lower than that before the cooling, and flows in the circulation path 31d to enter the pump 31a again.

The charging conduction path cooling circulation system 32 is a cooling system in which the cooling medium r circulates and cools the routing material 20. The charging conduction path cooling circulation system 32 in the embodiment is a branched cooling system branched from the power storage device cooling circulation system 31. In the charging conduction path cooling circulation system 32, the cooling medium r branched from the power storage device cooling circulation system 31 circulates and flows in the cooling pipe 30 to cool the routing material 20. In other words, in the cooling unit 3 in the embodiment, a part of the power storage device cooling circulation system 31 is used in common as a part of the charging conduction path cooling circulation system 32. A part of the flow path including the pump 31a and the cooling device 31c of the power storage device cooling circulation system 31 is used in common with the charging conduction path cooling circulation system 32. The charging conduction path cooling circulation system 32 includes a circulation path 32a in which the cooling medium r branched from the circulation path 31d of the power storage device cooling circulation system 31 circulates. In the circulation path 32a, the cooling medium r flowing in the circulation path 31d is branched at a branch 31e, flows in the cooling pipe 30, and thereafter joins the circulation path 31d at a joining portion 31f again for circulation. The branch 31e is located on a downstream side of the pump 31a and an upstream side of the heat exchange unit 31b in the circulation path 31d. The joining portion 31f is located on the downstream side of the heat exchange unit 31b and the upstream side of the cooling device 31c in the circulation path 31d.

In the charging conduction path cooling circulation system 32 thus structured, the cooling medium r pumped by the pump 31a flows in the circulation path 31d and a part of the cooling medium r flows in the circulation path 32a via the branch 31e. The cooling medium r flowing in the circulation path 32a after being branched at the branch 31e enters the cooling pipe 30. The cooling medium r having entered the cooling pipe 30 exchanges heat with the routing material 20 in the cooling pipe 30 to cool the routing material 20. The cooling medium r after the heat exchange in the cooling pipe 30 flows in the circulation path 32a while having a higher temperature than that before the heat exchange, and joins the circulation path 31d via the joining portion 31f. The cooling medium r flowing in the circulation path 31d after joining the circulation path 31d at the joining portion 31f is cooled by the cooling device 31c, and enters the pump 31a again.

The flow path control valve 33 can control the cooling medium r to flow to the power storage device 104 and flow to the cooling pipe 30. The flow path control valve 33 includes an electromagnetic valve or an electric-operated valve, for example. The flow path control valve 33 is disposed at the branch 31e of the power storage device cooling circulation system 31 and the charging conduction path cooling circulation system 32. The flow path control valve 33 can switch a cutoff state where the flow of the cooling medium r to the power storage device 104 is cut off and a flowing state where the cooling medium r can flow to the power storage device 104, in the power storage device cooling circulation system 31. In addition, the flow path control valve 33 can switch a cutoff state where the flow of the cooling medium r to the cooling pipe 30 is cut off and a flowing state where the cooling medium r can flow to the cooling pipe 30, in the power storage device cooling circulation system 31. The flow path control valve 33 may be capable of precisely adjusting a flow rate of the cooling medium r to the power storage device 104 and a flow rate of the cooling medium r to the cooling pipe 30. In other words, the flow path control valve 33 may be capable of adjusting a flow rate of the cooling medium r flowing straight to the power storage device cooling circulation system 31 and a flow rate of the cooling medium r that is branched from the power storage device cooling circulation system 31 and flows in the charging conduction path cooling circulation system 32. The flow path control valve 33 is electrically connected to the controller 34 and its operation is controlled by the controller 34.

The controller 34 controls the respective components in the cooling unit 3. The controller 34 includes an electronic circuit having, as a main unit, a known microcomputer including a central processing unit (CPU), a read only memory (ROM), a random access memory (RAM), and an interface, for example. The controller 34 is electrically connected to the various components in the cooling unit 3, such as the pump 31a and the flow path control valve 33, and controls their operations. The controller 34 executes a control program stored in the ROM, the RAM, or the like to perform various types of processing for controlling the respective components in the cooling unit 3. For example, the power storage device 104 can increase charging efficiency by being adjusted to have an appropriate temperature when being charged. For such adjustment, the power storage device 104 is cooled by the cooling medium r flowing in the power storage device cooling circulation system 31 in accordance with an environment temperature, or the power storage device 104 is warmed up by a temperature adjuster provided separately from the cooling unit 3, for example. The controller 34 in the embodiment performs control described below such that the routing material 20 is able to be cooled even when the power storage device 104 does not need to be cooled by the cooling unit 3. When the power storage device 104 does not need to be cooled by the cooling unit 3, the controller 34 controls the flow path control valve 33 so as to achieve the cutoff state where the flow of the cooling medium r to the power storage device 104 is cut off and the flowing state where the cooling medium r flows to the cooling pipe 30. As a result, the controller 34 can continue to cool the routing material 20 by the cooling medium r flowing in a part of the power storage device cooling circulation system 31 and the charging conduction path cooling circulation system 32 even in the state where the cooling of the power storage device 104 by the cooling medium r flowing in the power storage device cooling circulation system 31 is stopped.

In the wire harness unit 1, the power storage device unit 103, and the wire harness 2, the charging conduction path 50 extends between the charging inlet 106 and the power storage device 104 and transmits electricity. This structure makes it possible to supply electric power from the charging inlet 106 to the power storage device 104 via the charging conduction path 50 to charge the power storage device 104. In this case, the routing material 20 constituting the charging conduction path 50 is cooled by the cooling unit 3 in the wire harness unit 1. This structure makes it possible for the wire harness unit 1 to cool the routing material 20 even in a case where the routing material 20 generates heat when the power storage device 104 is cooled via the charging conduction path 50. As a result, the wire harness unit 1 can reduce the cross-sectional area of the routing material 20 to a relatively small area. In other words, the wire harness unit 1 can prevent the routing material 20 from being excessively heated by cooling the routing material 20 by the cooling unit 3 even when an amount of heat generated by the routing material 20 becomes relatively large as a result of reducing the cross-sectional area of the routing material 20 to a relatively small area. This structure makes it possible to prevent an increase in the cross-sectional shape of the conduction portion of the routing material 20 constituting the charging conduction path 50 of the wire harness 2 even when voltage and current of the direct current power flowing in the wire harness 2 are highly increased. In addition, the wire harness unit 1 can reduce the cross-sectional area of the routing material 20 to a relatively small area, thereby making it possible to reduce its weight. As a result, the wire harness unit 1, the power storage device unit 103, and the wire harness 2 can have proper mountability.

More specifically, in the wire harness unit 1, the power storage device unit 103, and the wire harness 2, the cooling unit 3 can cool the routing material 20 by the cooling medium r flowing inside the cooling pipe 30. This structure makes it possible for the wire harness unit 1, the power storage device unit 103, and the wire harness 2 to properly cool the routing material 20 and have proper mount ability.

In the wire harness unit 1, the power storage device unit 103, and the wire harness 2, the cooling pipe 30 constitutes the charging conduction path cooling circulation system 32 branched from the power storage device cooling circulation system 31. This structure makes it possible for the wire harness unit 1 to use a part of the charging conduction path cooling circulation system 32 in which the cooling medium r circulates and flows in the cooling pipe 30 in common with the power storage device cooling circulation system 31 for cooling the power storage device 104. As a result, the wire harness unit 1, the power storage device unit 103, and the wire harness 2 can reduce the number of constituent parts of the cooling unit 3, thereby making it possible to prevent an increase in size of the wire harness unit 1, the power storage device unit 103, and the wire harness 2. The wire harness unit 1, the power storage device unit 103, and the wire harness 2, thus, can further enhance mountability. In addition, manufacturing costs of the wire harness unit 1, the power storage device unit 103, and the wire harness 2 can be reduced because the wire harness unit 1, the power storage device unit 103, and the wire harness 2 can reduce the number of constituent parts of the cooling unit 3.

In the wire harness unit 1, the power storage device unit 103, and the wire harness 2, the cooling unit 3 includes the flow path control valve 33. This structure makes it possible for the wire harness unit 1 to cool the routing material 20 by the cooling medium r flowing in the cooling pipe 30 regardless of whether the power storage device 104 is cooled even in the structure where a part of the charging conduction path cooling circulation system 32 is used in common with the power storage device cooling circulation system 31.

In the wire harness unit 1, the power storage device unit 103, and the wire harness 2, the routing material 20 may be constituted by the covered bus bar 21 including the plate-shaped conductor 21a, for example. In this case, the wire harness unit 1 can cause the portion constituted by the covered bus bar 21 in the routing material 20 to function as the path regulating portion that regulates the routing path of the charging conduction path 50. In this case, the wire harness unit 1 can reliably keep the shape of the routing material 20 that according to the routing path because the path regulating portion constituted by the covered bus bar 21 has a relatively high shape keeping function. This structure makes it possible to enhance routing workability of the wire harness unit 1 to the vehicle V. For example, this structure can also reduce the number of fixtures such as clamps used for the routing work. As a result, the wire harness unit 1, the power storage device unit 103, and the wire harness 2, thus, can further enhance mountability. In such a structure, the wire harness unit 1 can properly cool the plate-shaped conductor 21$a$ by the cooling medium r flowing in a pair of cooling pipes 30 arranged such that the cooling pipes 30 sandwich the covered bus bar 21 including the plate-shaped conductor 21$a$.

In the wire harness unit 1, the power storage device unit 103, and the wire harness 2, the routing material 20 may be constituted by the covered electrical wire 22 including the wire-shaped conductor 22$a$, for example. In this case, the wire harness unit 1 can cause the portion constituted by the covered electrical wire 22 in the routing material 20 to function as the deformation allowable portion that allows the deformation of the charging conduction path 50. In this case, the wire harness unit 1 can flexibly cope with change or fine adjustment of the routing path of the charging conduction path 50 because the deformation allowable portion constituted by the covered electrical wire 22 has a relatively high shape changeable function. The wire harness unit 1 thus structured can absorb various tolerances by the covered electrical wire 22 including the wire-shaped conductor 22$a$ when the wire harness unit 1 is assembled to the vehicle V or connected to the respective portions in the vehicle V, for example. In addition, this structure makes it possible to enhance workability of the wire harness unit 1 in various works such as packing, transportation, routing, and fitting of connectors, for example. In these points of view, the wire harness unit 1, the power storage device unit 103, and the wire harness 2 can enhance the mountability on the vehicle V. In such a structure, the wire harness unit 1 can properly cool the wire-shaped conductor 22$a$ by the cooling medium r flowing in the cooling pipe 30 provided such that the cooling pipe 30 covers the covered electrical wire 22 including the wire-shaped conductor 22$a$.

In the wire harness unit 1, the power storage device unit 103, and the wire harness 2, the routing material 20 may include both of the covered bus bar 21 and the covered electrical wire 22, and, thus, may include both of the path regulating portion and the deformation allowable portion. In this case, the wire harness unit 1 can keep the shape thereof that according to the routing path of the charging conduction path 50 by the portion thereof including the plate-shaped conductor 21$a$ constituting the path regulating portion, and can also have mobility by the portion thereof including the wire-shaped conductor 22$a$ constituting the deformation allowable portion. In this case, the wire harness unit 1 can have both of the shape keeping function and the shape changeable function of the routing path of the charging conduction path 50. This structure makes it possible for the wire harness unit 1 to achieve a balance between proper flexibility and stiffness required for the respective portions in the routing material 20. As a result, the wire harness unit 1 can have good routing workability and good handling property, for example. Besides those described above, the wire harness unit 1 can properly cool the routing material 20 by the cooling unit 3.

The wire harness unit, the power storage device unit, and the wire harness according to the embodiment are not limited to those described in the embodiment. Various modifications can be made on them within the scope described in the claims.

In the explanation described above, the flow path control valve 33 is disposed at the branch 31$e$ of the power storage device cooling circulation system 31 and the charging conduction path cooling circulation system 32. The flow path control valve 33 is not limited to being disposed at the branch 31$e$. The flow path control valve 33 may include a plurality of valves disposed at locations other than the branch 31$e$ of the power storage device cooling circulation system 31 and the charging conduction path cooling circulation system 32.

In the explanation described above, the cooling unit 3 includes the power storage device cooling circulation system 31, the charging conduction path cooling circulation system 32, the flow path control valve 33, and the controller 34. The structure of the cooling unit 3 is not limited to this example. For example, the cooling unit 3 may not include the power storage device cooling circulation system 31 and the flow path control valve 33. The cooling unit 3 may include the charging conduction path cooling circulation system 32 alone. In this case, in the cooling unit 3, the pump 31$a$ and the cooling device 31$c$, for example, may be provided in the charging conduction path cooling circulation system 32.

In the explanation described above, the cooling pipes 30 are preferably arranged on both sides of the plate-shaped conductor 21$a$ in the thickness direction as a pair sandwiching the plate-shaped conductor 21$a$ when the cooling pipe 30 is applied to the covered bus bar 21. The cooling pipe 30 is not limited to being disposed described above. When the cooling pipe 30 is applied to the covered bus bar 21, the cooling pipe 30 may be provided such that the cooling pipe 30 covers the outside of the covered bus bar 21 in the same manner as the case where the cooling pipe 30 is applied to the covered electrical wire 22.

In the explanation described above, the cooling pipe 30 is provided in such a manner that the cooling pipe 30 is adjacent to and in contact with the routing material 20 along the whole length of the routing material 20 from the charging inlet 106 to the power storage device 104. The cooling pipe 30 is not limited to being provided as described above. The cooling pipe 30 may be provided in such a manner that the cooling pipe 30 is adjacent to and in contact with the routing material 20 along a part of the whole length of the routing material 20 from the charging inlet 106 to the power storage device 104, and may cool a part of the routing material 20 by the cooling medium r flowing in the flow path 30$a$.

Figure 5:
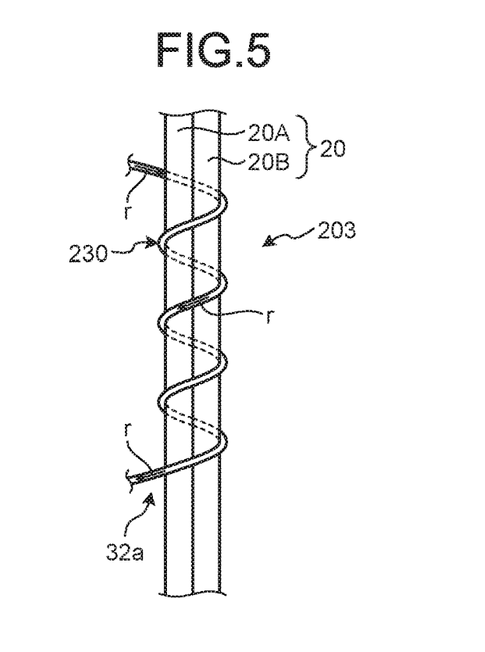
FIG. 5 is a schematic diagram illustrating a schematic structure of a cooling unit of a wire harness unit according to a modification.

In the explanation described above, in the cooling unit 3, the cooling pipe 30 extends along the routing material 20. The cooling pipe 30 is not limited to extend along the routing material 20. In a modification illustrated in FIG. 5, a cooling unit 203 according to the modification differs from the cooling unit 3 in that the cooling unit 203 is provided with a cooling pipe 230 instead of the cooling pipe 30. The cooling unit 203 has substantially the same structure as the cooling unit 3 except for that described above. The cooling pipe 230 differs from the cooling pipe 30 in that the cooling pipe 230 is spirally wound on the routing material 20. The cooling pipe 230 has substantially the same structure as the cooling pipe 30 except for that described above. In this case, the wire harness unit 1, the power storage device unit 103, and the wire harness 2 can also cool the routing material 20 by the cooling medium r flowing inside the cooling pipe 230 of the cooling unit 203. As a result, the wire harness unit 1, the power storage device unit 103, and the wire harness 2 can have proper mountability.

Figure 6:
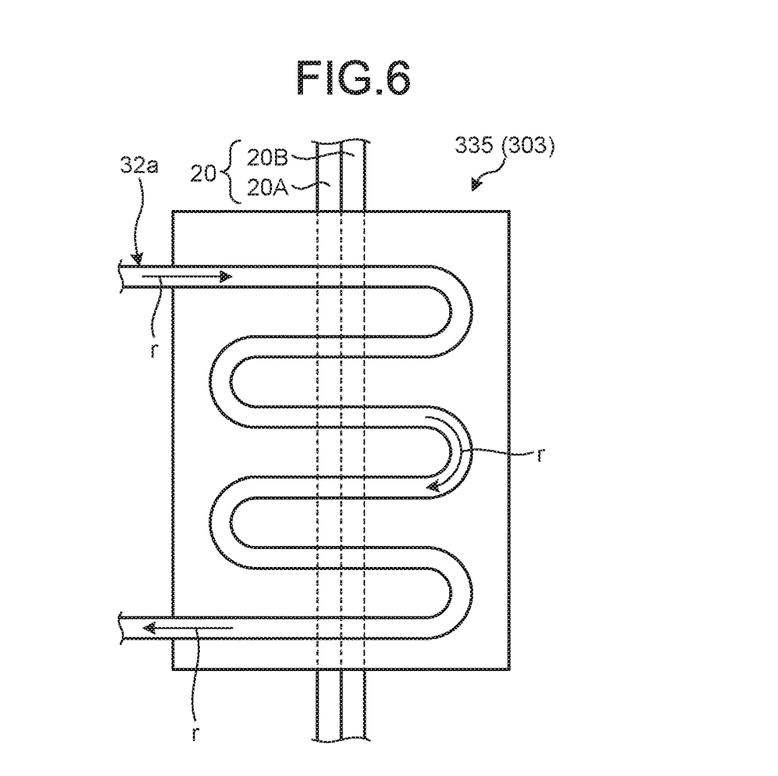
FIG. 6 is schematic diagram illustrating a schematic structure of a cooling unit of a wire harness unit according to another modification.

In another modification illustrated in FIG. 6, a cooling unit 303 according to the modification differs from the cooling units 3 and 203 in that the cooling unit 303 is provided with a heat exchange unit 335 instead of the cooling pipe 30. The heat exchange unit 335 is a heat exchanger that is connected to the circulation path 32a and the cooling medium r circulating in the circulation path 32a enters. The heat exchange unit 335 performs heat exchange between the cooling medium r circulating in the circulation path 32a and the routing material 20 to cool the routing material 20. In this case, the wire harness unit 1, the power storage device unit 103, and the wire harness 2 can cool the routing material 20 by the cooling unit 303, thereby having proper mountability. Besides the cooling units described above, a cooling unit that cools the routing material 20 may include a cooling fan used for cooling the routing material 20 by winding a cooling wind to the routing material 20, for example. Any structure that can forcibly cool the routing material 20 may be employed as the cooling unit for cooling the routing material 20.

In the explanation described above, in the cooling units 3, the cooling medium r circulating in the cooling pipe 30 is liquid. The cooling medium r is not limited to liquid. The cooling unit 403 according to the modification illustrated in FIG. 7 differs from the cooling unit 3 in that the cooling unit 403 provides the cooling pipe 430 instead of the cooling pipe 30 and the cooling medium r circulating in the cooling pipe 430 is gas. Further, the cooling unit 403 differs from the cooling unit 3 in that the cooling unit 403 provides the fan 435 instead of the power storage device cooling circulation system 31, the charging conduction path cooling circulation system 32, the flow path control valve 33 and the like. Other constitutions of the cooling unit 403 are substantially same as those of the cooling unit 3.

Figure 8:
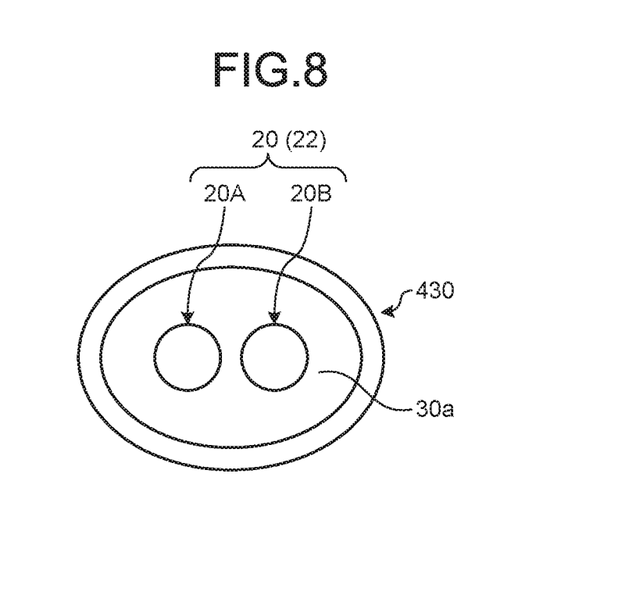
FIG. 8 is a schematic cross-sectional view illustrating a schematic structure of a cooling pipe of the wire harness unit according to another modification.

The cooling pipe 430 according to the modification illustrated in FIG. 8 differs from the cooling pipe 30 illustrated in FIG. 4 in that the cooling pipe 430 is provided to cover the outside of the supply wire 20A and the ground wire 20B constituting the routing material 20 collectively. Other constitutions of the cooling pipe 430 are substantially same as those of the cooling pipe 30. The cooling pipe 430 is formed in a hollow cylindrical shape and constitutes a cooling duct in which the cooling medium r can flow inside the flow path 30a. The cooling medium r according to the modification is gas such as air and the like. By this constitution, in the cooling unit 403 according to the modification, the routing material 20 can be cooled by the cooling medium r (gas) flowing inside the cooling pipe 430. In this case, the routing material 20 (the supply wire 20A and the ground wire 20B) is depicted as the covered electrical wire 22. However, the routing material 20 may be the covered bus bar 21 (refer to FIG. 3).

The fan 435 is a blower that supplies the cooling medium r as gas to the flow path 30a inside the cooling pipe 430. The controller 34 according to the modification is connected electrically to the fan 435 to control an operation of the fan 435. In the flow path 30a inside the cooling pipe 430, for example, the fan 435 supplies the cooling medium r from a side of the power storage device 104 to a side of the charging inlet 106. The cooling medium r supplied by the fan 435 is suctioned into the flow path 30a from an inlet on the side of the power storage device 104 of the cooling pipe 430. Then, the cooling medium r circulates in the flow path 30a, exchanges heat with the routing material 20 in the cooling pipe 430 to cool the routing material 20. The cooling medium r after the heat exchange in the cooling pipe 430 is exhausted from an outlet on the side of the charging inlet 106 to outside.

In this case, the wire harness unit 1, the power storage device unit 103, and the wire harness 2 can cool the routing material 20 by the cooling unit 403 through the cooling medium r (gas) flowing inside the cooling pipe 430. As a result, the wire harness unit 1, the power storage device unit 103, and the wire harness 2 can ensure proper mount ability.

In the cooling unit 403 according to the modification, the fan 435 supplies the cooling medium r in the flow path 30a from the side of the power storage device 104 to the side of the charging inlet 106. Therefore, it is possible to easily exhaust heat generated in the power storage device 104 side to vehicle exterior. In this case, in the cooling unit 403, the fan 435 may supply the cooling medium r in the flow path 30a from the side of the charging inlet 106 to the side of the power storage device 104.

The cooling unit 403 according to the modification may include the power storage device cooling circulation system 31, the charging conduction path cooling circulation system 32, the flow path control valve 33, and a controller 34, same as in the above-mentioned cooling unit 3 (refer to FIG. 2). In this case, in the cooling unit 403, a blower device such as the fan 435 for supplying the cooling medium r as gas is applied in place of the pump 31a that applies pressure to the cooling medium r as liquid to deliver. In this case as in the same as the embodiment, when the power storage device 104 does not need to be cooled by the cooling unit 403, the controller 34 may control the flow path control valve 33 so as to achieve the cutoff state where the flow of the cooling medium r to the power storage device 104 side is cut off and the flowing state where the cooling medium r flows to the cooling pipe 30 side. As a result, the controller 34 can continue to cool the routing material 20 by the cooling medium r flowing in a part of the power storage device cooling circulation system 31 and the charging conduction path cooling circulation system 32 even in the state where the cooling of the power storage device 104 by the cooling medium r flowing in the power storage device cooling circulation system 31 is stopped.

Figure 9:
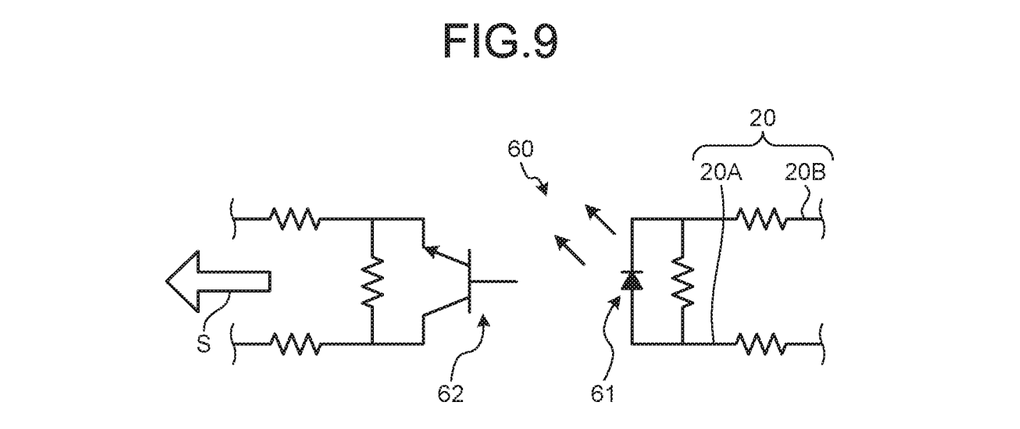
FIG. 9 is constitutional diagram illustrating a schematic structure of a voltage detecting circuit provided to the wire harness unit according to another modification.

The wire harness unit 1, the power storage device unit 103, and the wire harness 2 may further include a voltage detecting circuit 60 as schematically illustrated in FIG. 9. The voltage detecting circuit 60 is a circuit that detects potential difference that has been generated between the supply wire 20A and the ground wire 20B constituting the routing material 20. The potential difference between the supply wire 20A and the ground wire 20B is generated when various types of relays or switched connected between the supply wire 20A and the ground wire 20B and the power storage device 104 are turned on to establish a conduction state, or in a state where the charging connector 107 is fitted to the charging inlet 106.

The voltage detecting circuit 60 includes, for example, a diode 61 and a phototransistor 62. The diode 61 is provided so as to connect ends of the supply wire 20A and the ground wire 20B on the side of the charging inlet 106. By this constitution, the diode 61 emits light when a potential difference is generated between the supply wire 20A and the ground wire 20B. When the diode 61 emits light, the phototransistor 62 detects light emitted by the diode 61. After detecting light emitted by the diode 61, the phototransistor 62 transmits a potential-difference-generation detecting signal S to the controller 34. By this constitution, it is possible to detect generation of a potential difference between the supply wire 20A and the ground wire 20B by the voltage detecting circuit 60. When generating a potential difference, it is possible to transmit the potential-difference-generation detecting signal S to the controller 34 by the voltage detecting circuit 60.

Figure 7:
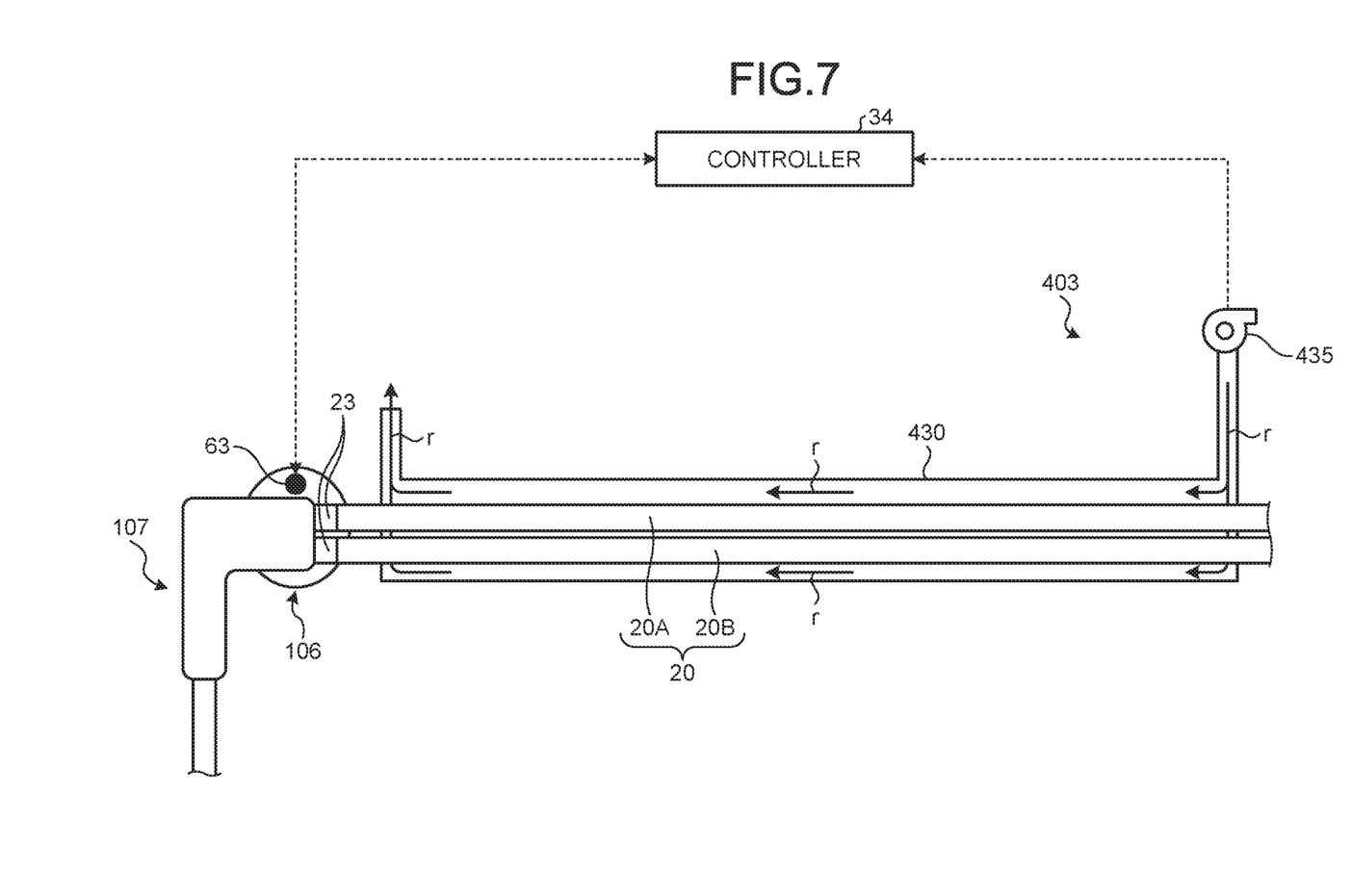
FIG. 7 is schematic diagram illustrating a schematic structure of a cooling unit of a wire harness unit according to another modification.

The wire harness unit 1, the power storage device unit 103, and the wire harness 2 may further include an indicator LED 63 for alarm located adjacent to the charging inlet 106 (refer to FIG. 7). Upon receiving the potential-difference-generation detecting signal S, the controller 34 lights up the indicator LED 63, for example. By this constitution, in the wire harness unit 1, the power storage device unit 103, and the wire harness 2, it is possible to alarm a user that a potential difference between the supply wire 20A and the ground wire 20B is generated, thereby improving safety.

The controller 34 may control each section of the cooling units 3, 203, 303, and 403 such that the controller 34 controls to continue stopped state of cooling of the routing material 20 by the cooling units 3, 203, 303, and 403, when the potential-difference-generation detecting signal S is not received, for example. Then, the controller 34 controls each section of the cooling units 3, 203, 303, and 403 such that the controller 34 controls to start cooling of the routing material 20 by the cooling units 3, 203, 303, and 403, upon receiving the potential-difference-generation detecting signal S as a trigger. By this constitution, the wire harness unit 1, the power storage device unit 103, and the wire harness 2 can efficiently cool the routing material 20 with an appropriate timing.

In the above described the wire harness unit 1, the power storage device unit 103, and the wire harness 2, a mechanism including an electrical magnet and the like may be provided that tightly attracts the charging inlet 106 and the charging connector 107 in a state where the charging connector 107 is fitted to the charging inlet 106. By this constitution, the wire harness unit 1, the power storage device unit 103, and the wire harness 2 can reliably maintain the state where the charging connector 107 is fitted to the charging inlet 106 even in a state where the cooling medium r is flowed by the fan 435 and the like.

In the explanation described above, in the wire harness unit 1, the cooling units 3, 203, 303, and 403 are applied to the wire harness 2 that serves as the charging wire harness for quick charging. The cooling units 3, 203, 303, and 403 are not limited to being applied to the wire harness 2 serving as the charging wire harness for quick charging. In the wire harness unit 1, the cooling units 3, 203, 303, and 403 may be applied to a wire harness that serves as the charging wire harness for normal charging in which low output direct current power flows with a low voltage and a low current.

In the above described wire harness unit, the power storage device unit, and the wire harness, it is possible to configure the wire harness unit, the power storage device unit, and the wire harness by incorporating the above described each of the embodiments and the modifications appropriately.

In the wire harness unit, the power storage device unit, and the wire harness according to the embodiment, the charging conduction path extends between the charging inlet and the power storage device and transmits electricity. This structure makes it possible for the wire harness unit to supply electric power from the charging inlet to the power storage device via the charging conduction path to charge the power storage device. In this case, in the wire harness unit, the routing material forming the charging conduction path is cooled by the cooling unit. This structure makes it possible for the wire harness unit to cool the routing material even when the routing material generates heat in charging the power storage device via the charging conduction path. As a result, the wire harness unit, the power storage device unit, and the wire harness can reduce the cross-sectional area of the routing material, thereby having an advantageous effect of capable of having proper mountability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness unit mounted in a vehicle, the wire harness unit comprising:
   a routing material that extends between a charging inlet provided to a vehicle exterior and a power storage device provided in the vehicle, the power storage device being capable of storing electric power, and the routing material being a charging conduction path for transmitting electricity; and
   a cooling unit provided in the vehicle and configured to cool the routing material,
   wherein the cooling unit includes a charging conduction path cooling circulation system and a power storage device cooling circulation system, the charging conduction path cooling circulation system and the power storage device cooling circulation system being disposed in parallel,
   wherein the charging conduction path cooling circulation system includes a cooling pipe, at least a part of which is provided along the routing material and inside which a cooling medium is able to flow, and the cooling pipe being capable of cooling the routing material by the cooling medium flowing inside the cooling pipe, and
   wherein the charging conduction path cooling circulation system is branched from the power storage device cooling circulation system, provided in the vehicle, in which the cooling medium is configured to circulate and cool the power storage device by the cooling medium.

2. The wire harness unit according to claim 1, wherein the cooling unit further includes a flow path control valve configured to control a flow of the cooling medium in the charging conduction path cooling circulation system and the power storage device cooling circulation system, and is capable of selectively cutting off the flow of the cooling medium in the charging conduction path cooling circulation system and the power storage device cooling circulation system.

3. The wire harness unit according to claim 1, wherein the routing material includes a plate-shaped conductor that has conductivity and a plate shape, and is at least a part of the charging conduction path, and
   the cooling pipe includes a first cooling pipe and a second cooling pipe which are provided at least on both sides of the plate-shaped conductor in a thickness direction of the plate-shaped conductor as a pair sandwiching the plate-shaped conductor.

4. The wire harness unit according to claim 2, wherein the routing material includes a plate-shaped conductor that has conductivity and a plate shape, and is at least a part of the charging conduction path, and
   the cooling pipe includes a first cooling pipe and a second cooling pipe which are provided at least on both sides of the plate-shaped conductor in a thickness direction of the plate-shaped conductor as a pair sandwiching the plate-shaped conductor.

5. The wire harness unit according to claim 1, wherein
the routing material includes a wire-shaped conductor that is formed in a wire shape by bundling a plurality of element wires having conductivity and is at least a part of the charging conduction path, and
the cooling pipe covers an outside of the wire-shaped conductor.

6. The wire harness unit according to claim 2, wherein
the routing material includes a wire-shaped conductor that is formed in a wire shape by bundling a plurality of element wires having conductivity and is at least a part of the charging conduction path, and
the cooling pipe covers an outside of the wire-shaped conductor.

7. The wire harness unit according to claim 3, wherein
the routing material includes a wire-shaped conductor that is formed in a wire shape by bundling a plurality of element wires having conductivity and is at least a part of the charging conduction path, and
the cooling pipe covers an outside of the wire-shaped conductor.

8. The wire harness unit according to claim 1, wherein
the cooling medium is a liquid, and
the cooling unit includes a pump that supplies the cooling medium inside the cooling pipe.

9. The wire harness unit according to claim 2, wherein
the cooling medium is a liquid, and
the cooling unit includes a pump that supplies the cooling medium inside the cooling pipe.

10. The wire harness unit according to claim 3, wherein
the cooling medium is a liquid, and
the cooling unit includes a pump that supplies the cooling medium inside the cooling pipe.

11. The wire harness unit according to claim 1, wherein
the cooling medium is a gas, and
the cooling unit includes a fan that supplies the cooling medium inside the cooling pipe.

12. The wire harness unit according to claim 2, wherein
the cooling medium is a gas, and
the cooling unit includes a fan that supplies the cooling medium inside the cooling pipe.

13. A power storage device unit comprising:
a power storage device mounted in a vehicle and capable of storing electric power;
a routing material that extends between a charging inlet provided on an exterior of the vehicle and the power storage device, and is a charging conduction path configured to transmit electricity;
a cooling unit provided in the vehicle that is configured to cool the routing material;
a power storage device cooling circulation system provided in the vehicle that is configured to cool the power storage device by the cooling medium, and
a charging conduction path cooling circulation system disposed in parallel to the power storage device cooling circulation system,
wherein the charging conduction path cooling circulation system includes a cooling pipe, at least a part of which is provided along the routing material and inside which a cooling medium is able to flow, and the cooling pipe being capable of cooling the routing material by the cooling medium flowing inside the cooling pipe, and
wherein the charging conduction path cooling circulation system is branched from the power storage device cooling circulation system in which the cooling medium is configured to circulate.

14. A wire harness mounted in a vehicle, the wire harness comprising:
a routing material that extends between a charging inlet provided to an exterior of the vehicle and a power storage device provided in the vehicle, the power storage device being capable of storing electric power, the routing material being a charging conduction path configured to transmit electricity, and configured to be cooled by a cooling unit provided in the vehicle, and
a cooling pipe being connecting to the cooling unit, at least a part of the cooling pipe being provided along the routing material and inside which a cooling medium is able to flow, and the cooling pipe being capable of cooling the routing material by the cooling medium flowing inside the cooling pipe, and
wherein the cooling pipe is a charging conduction path cooling circulation system disposed in parallel to and branched from a power storage device cooling circulation system, provided in the vehicle, in which the cooling medium is configured to circulate and cool the power storage device by the cooling medium.

* * * * *